United States Patent
Bunker

(10) Patent No.: US 10,815,782 B2
(45) Date of Patent: Oct. 27, 2020

(54) METHODS FOR REPAIRING AIRFOIL TRAILING EDGES TO INCLUDE EJECTION SLOTS THEREIN

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 871 days.

(21) Appl. No.: 15/191,934

(22) Filed: Jun. 24, 2016

(65) Prior Publication Data

US 2017/0370222 A1   Dec. 28, 2017

(51) Int. Cl.
| | |
|---|---|
| *B22F 3/105* | (2006.01) |
| *F01D 5/00* | (2006.01) |
| *F01D 5/18* | (2006.01) |
| *B33Y 10/00* | (2015.01) |
| *B33Y 80/00* | (2015.01) |
| *B23P 6/00* | (2006.01) |
| *B23P 6/04* | (2006.01) |
| *F01D 9/02* | (2006.01) |
| *F01D 25/12* | (2006.01) |

(52) U.S. Cl.
CPC .............. *F01D 5/005* (2013.01); *B23P 6/007* (2013.01); *B23P 6/045* (2013.01); *B33Y 10/00* (2014.12); *B33Y 80/00* (2014.12); *F01D 5/18* (2013.01); *F01D 5/186* (2013.01); *F01D 9/02* (2013.01); *F01D 25/12* (2013.01); *F05D 2220/32* (2013.01); *F05D 2230/30* (2013.01); *F05D 2230/80* (2013.01); *F05D 2240/80* (2013.01); *F05D 2260/202* (2013.01); *F05D 2300/175* (2013.01)

(58) Field of Classification Search
CPC ...................................................... B22F 3/1055
See application file for complete search history.

(56) References Cited

U.S. PATENT DOCUMENTS

| | | |
|---|---|---|
| 6,427,327 B1 | 8/2002 | Bunker |
| 9,039,917 B2 | 5/2015 | Szuromi |
| 9,085,980 B2 | 7/2015 | Mittendorf |
| | (Continued) | |

FOREIGN PATENT DOCUMENTS

| | | |
|---|---|---|
| EP | 2 495 397 A2 | 9/2012 |
| EP | 2 942 424 A2 | 11/2015 |
| | (Continued) | |

OTHER PUBLICATIONS

Matthew J. Donachie, Rensselaer at Hartford, and Stephen J. Donachie, "Superalloys," Metals Handbook Desk Edition, Second Edition J.R. Davis, Editor, p. 394-414 (1998) (Year: 1998).*

(Continued)

*Primary Examiner* — Christopher S Kessler
(74) *Attorney, Agent, or Firm* — Dority & Manning, P.A.

(57) ABSTRACT

Methods for repairing a trailing edge of an airfoil are provided. The method can include removing a portion of the trailing edge of the airfoil to form an intermediate component, and then applying using additive manufacturing a replacement portion on the intermediate component to form a repaired airfoil. The replacement portion defines at least one trailing edge ejection slot.

20 Claims, 6 Drawing Sheets

(56) References Cited

U.S. PATENT DOCUMENTS

| | | |
|---|---|---|
| 9,174,312 B2 | 11/2015 | Baughman |
| 9,422,816 B2 * | 8/2016 | Spangler ................. F01D 5/186 |
| 2005/0235492 A1 * | 10/2005 | Arness ................. B23K 9/0026 |
| | | 29/889.1 |
| 2008/0260964 A1 | 10/2008 | Bagavath-Singh |
| 2010/0239409 A1 * | 9/2010 | Draper .................... F01D 5/005 |
| | | 415/1 |
| 2011/0264413 A1 * | 10/2011 | Stankowski ............ B23P 6/005 |
| | | 703/1 |
| 2013/0086784 A1 * | 4/2013 | Bunker ..................... C23C 4/00 |
| | | 29/402.03 |
| 2014/0079540 A1 | 3/2014 | Morris |
| 2014/0163717 A1 | 6/2014 | Das |
| 2014/0178206 A1 | 6/2014 | Gohler et al. |
| 2015/0251280 A1 | 9/2015 | Bunker |
| 2015/0275687 A1 | 10/2015 | Bruck |
| 2015/0314403 A1 | 11/2015 | Bruck |

FOREIGN PATENT DOCUMENTS

| | | |
|---|---|---|
| WO | WO2014/052323 A1 | 4/2014 |
| WO | 2014/165337 A1 | 10/2014 |

OTHER PUBLICATIONS

International Search Report and Written Opinion issued in connection with corresponding PCT Application No. PCT/US2017/37389 dated Sep. 27, 2017.

* cited by examiner

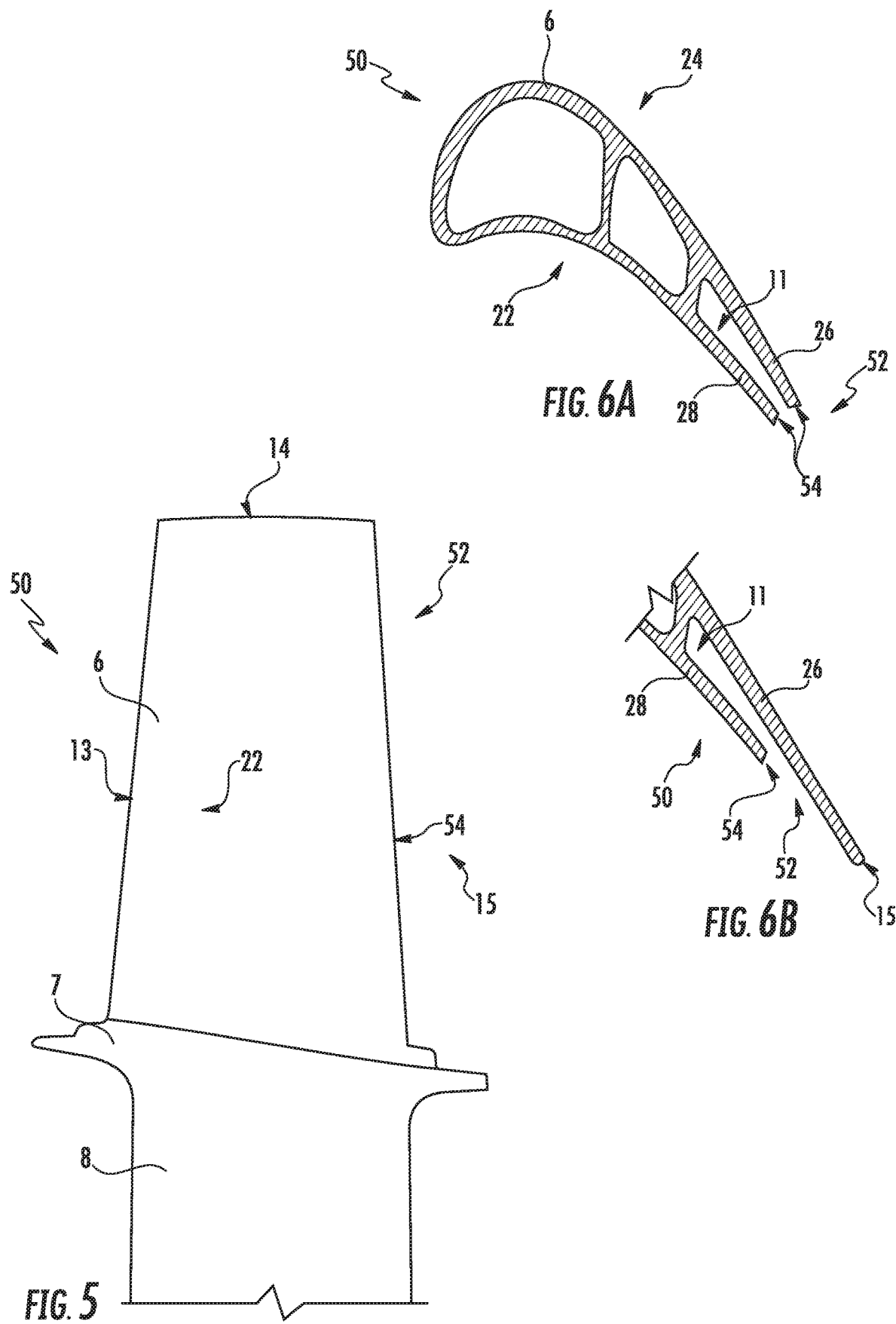

METHODS FOR REPAIRING AIRFOIL TRAILING EDGES TO INCLUDE EJECTION SLOTS THEREIN

FIELD OF THE INVENTION

The present invention generally relates to methods for repairing an airfoil of an engine and, more particularly, to methods of rebuilding a trailing edge of the airfoil to include ejection slots not present in the original airfoil's construction and geometry.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. The components operating within the hot gas sections of the gas turbine engines are subjected to oxidation and thermo-mechanical fatigue, resulting in repair issues. Typically, components that are damaged are replaced with a new component, thereby increasing down-time and costs.

Various components within the gas turbine engine, including certain stator vanes (e.g., turbine nozzles) and rotor blades (e.g., turbine blades), are film cooled across certain areas of the component. Even still, areas of the component can be damaged over time, particularly in airfoil designs where the pressure side is cooled from bleed slots. Such bleed slots can be formed on the component over time during use. However, the replacement component, in operation, would be subjected to the same fate after its use in the engine. Thus, additional repair and replacement would be required.

Accordingly, it is desirable to provide improved repair methods for turbine components that enable improved cycle times and reduced costs without sacrificing component performance or durability.

BRIEF DESCRIPTION OF THE INVENTION

Objects and advantages of the invention will be set forth in part in the following description, or may be obvious from the description, or may be learned through practice of the invention.

Methods are generally provided for repairing a trailing edge of an airfoil. In one embodiment, the method includes removing a portion of the trailing edge of the airfoil to form an intermediate component, and then applying using additive manufacturing a replacement portion on the intermediate component to form a repaired airfoil. Generally, the replacement portion defines at least one trailing edge ejection slot.

Other features and aspects of the present invention are discussed in greater detail below.

BRIEF DESCRIPTION OF THE DRAWINGS

The invention may be best understood by reference to the following description taken in conjunction with the accompanying drawing figures in which:

FIG. 5 is a side view of an intermediate component formed from the exemplary turbine blade of FIG. 1 by removing a portion of the trailing edge from the airfoil;

FIG. 6A is a cross-sectional view of the airfoil of the intermediate component of FIG. 5;

FIG. 6B is a cross-sectional view of the airfoil of another exemplary intermediate component formed from the exemplary turbine blade of FIG. 1 by removing a portion of the trailing edge from the airfoil;

Figure 1:
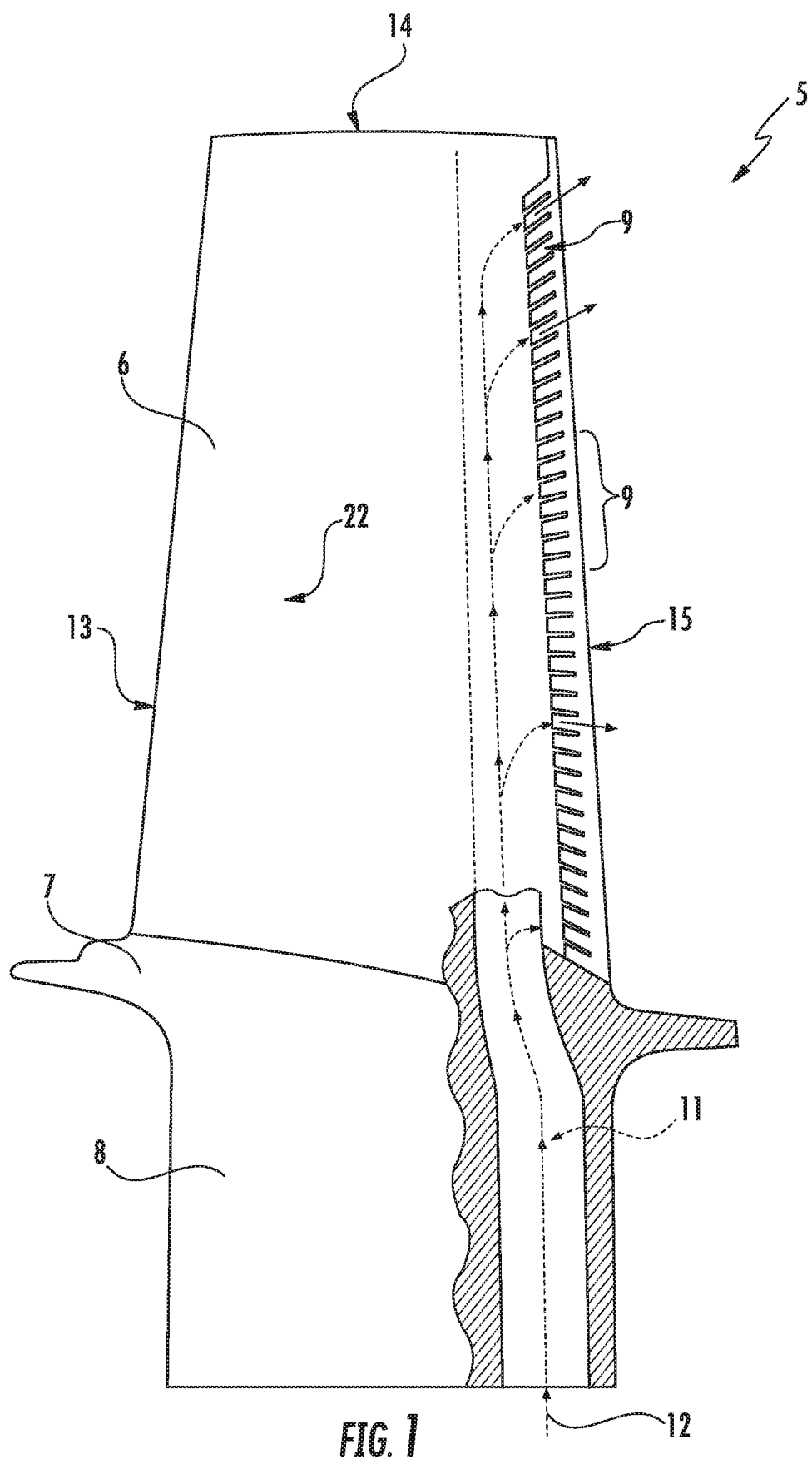
FIG. 1 is a side view of an exemplary turbine blade having an airfoil defining a plurality of trailing edge bleed slots.

Repeat use of reference characters in the present specification and drawings is intended to represent the same or analogous features or elements of the present invention.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for repairing a trailing edge of an airfoil, particularly for an airfoil of an engine (e.g., a gas turbine engine) exposed in a hot gas path within the engine. In one embodiment, a portion of the trailing edge of the airfoil is removed to form an intermediate component, and then repaired using additive manufacturing to form a replacement portion on the intermediate component. The replacement portion includes at least one trailing edge ejection slot absent in the original damaged geometry (previously removed). The trailing edge ejection slot(s) are fluidly connected to a cooling supply of the repaired component, such as being in fluid communication with a cooling supply internal within the airfoil. As such, the component can be repaired to include trailing edge ejection slot(s) not present in the original airfoil in order to serve as a corrective action to improve the performance of the airfoil. Such a method is particularly useful for a distressed trailing edge that has been damaged during use (e.g., by prolonged exposure to heat loading).

Referring to the drawings, FIG. 1 depicts an exemplary component 5 of a gas turbine engine, illustrated as a gas turbine blade. The turbine blade 5 includes an airfoil 6, a laterally extending platform 7, an attachment 8 in the form of a dovetail to attach the gas turbine blade 5 to a turbine disk. The airfoil 6 includes a leading edge 13, a tip 14 oppositely positioned from the platform 7, and a trailing edge 15. In some components, a number of cooling channels 11 extend through the interior of the airfoil 6, ending in openings 9 in the surface of the airfoil 6. For example, cooling fluid 12 is shown passing through the cooling channels 11 and out of the openings 9 defined on the trailing edge.

Figure 2:
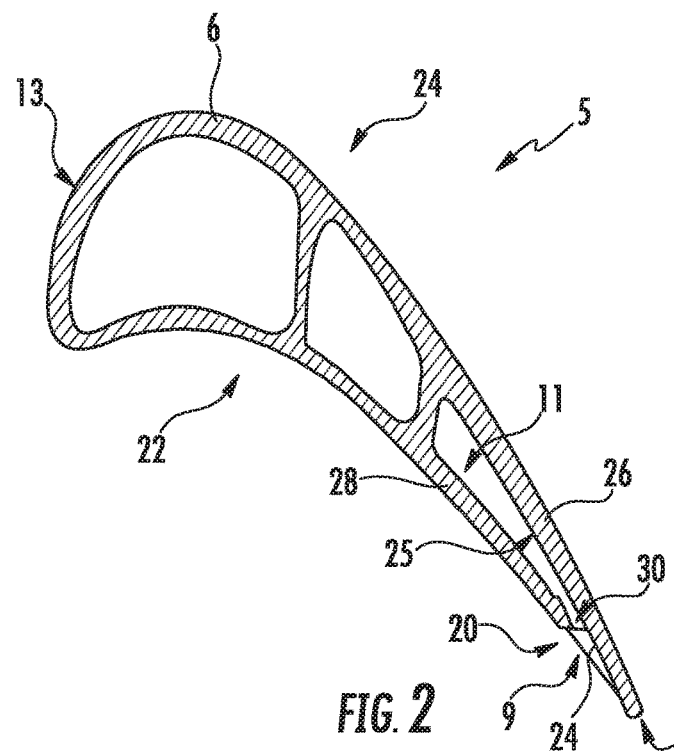
FIG. 2 is a cross-sectional view of the airfoil of FIG. 1 showing a trailing edge bleed slot.
Figure 3:
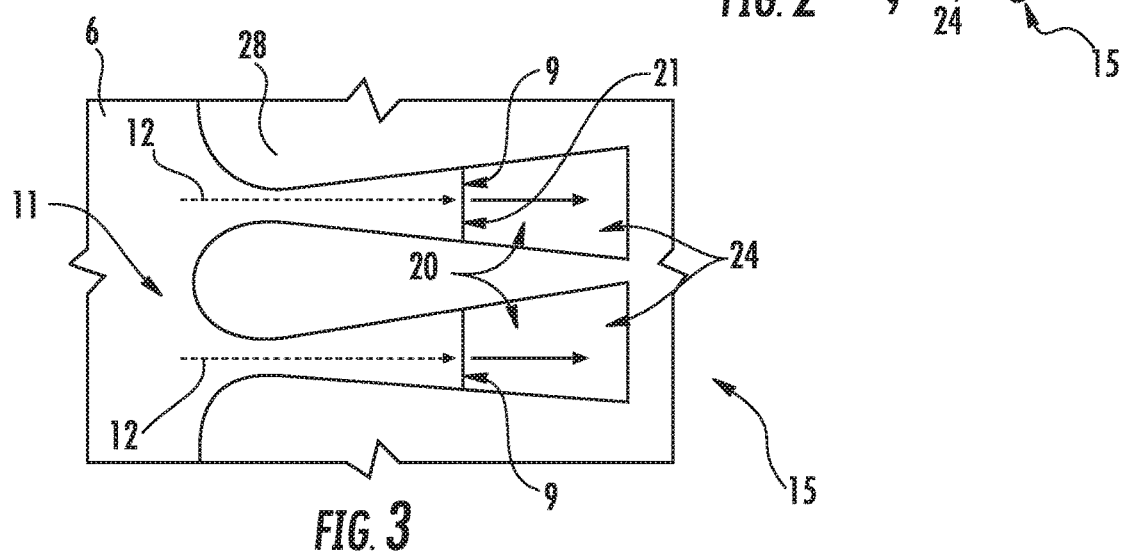
FIG. 3 is a close-up view of the trailing edge of the airfoil of FIG. 1 showing the trailing edge bleed slots.
Figure 4:
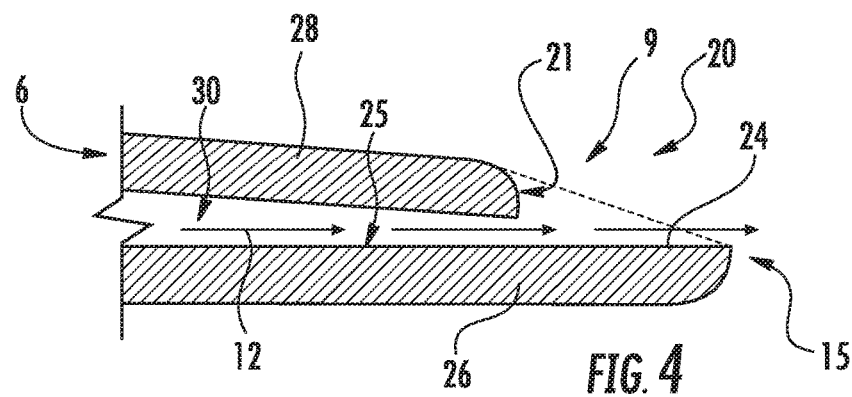
FIG. 4 is a close-up cross-sectional view of the trailing edge of the airfoil of FIG. 3.

The openings 9 may be, in particular embodiments, trailing edge bleed slots 20 located slightly inward on the pressure side 22 (opposite from the suction side) of the airfoil from the trailing edge 15. As shown more particularly in FIGS. 2-4, each of the trailing edge bleed slots 20 includes, in this example, a diffusion section 24 defined by the inner surface 25 of the suction side wall 26 that extends beyond a slot end 21 of the pressure side wall 28. A cooling channel 30 is defined between the suction side wall 26 and the pressure side wall 28, which is fluidly connected to the inner passage 11 of the airfoil 6.

In one embodiment, the at least a portion of the trailing edge 15 is damaged or distressed after prolonged use of the airfoil 6, such as being burned, degraded over time during use, an abraded and/or dented, a missing a portion of material on its surface, etc. Such damage can be caused since the airfoil 6 of the turbine blade 5 of FIG. 1 is located within the turbine section of the engine and is subjected to the hot combustion gases from the engine's combustor.

The airfoil 6 of the turbine blade 5 of FIG. 1 can be formed of a material that can be formed to the desired shape and withstand the necessary operating loads at the intended operating temperatures of the area of the gas turbine in which the segment will be installed. Examples of such materials include metal alloys that include, but are not limited to, titanium-, aluminum-, cobalt-, nickel-, and steel-based alloys. In one particular embodiment, the airfoil 6 of FIG. 1 are formed from a superalloy metal material, such as a nickel-based superalloy, a cobalt-based superalloy, or an iron-based superalloy. In typical embodiments, the superalloy component has a 2-phase structure of fine γ-(M) (face-center cubic) and γ-(M)Al (body-center cubic). The β-(M)Al phase is the aluminum (Al) reservoir. Aluminum near the surface may be depleted during service by diffusion to the TBC interface forming α-$Al_2O_3$ thermally grown oxide on the surface of the diffusion coated substrate.

Referring to FIGS. 6A and 5, an intermediate component 50 is shown based on the blade 5 of FIG. 1 with a portion of the trailing edge 15 removed to define a cavity 52. The cavity 52 is at least as big as any damaged region on the blade 5. In certain embodiments, the cavity 52 may be slightly larger in volume than any damaged region. As such, it can be ensured that all of any damaged material can be removed to form the intermediate component 50. For example, other material can be removed in order to result in the intermediate component 50 having known dimensions, particularly having known dimensions defining the cavity 52. For example, the intermediate component 50 can have a predetermined height from which the repaired component 70 of FIG. 7 can subsequently be rebuilt. The predetermined height may be determined based on considerations such as the extent of any damaged portion and/or the structure of the interior cooling passages 11.

Figures 7, 8:
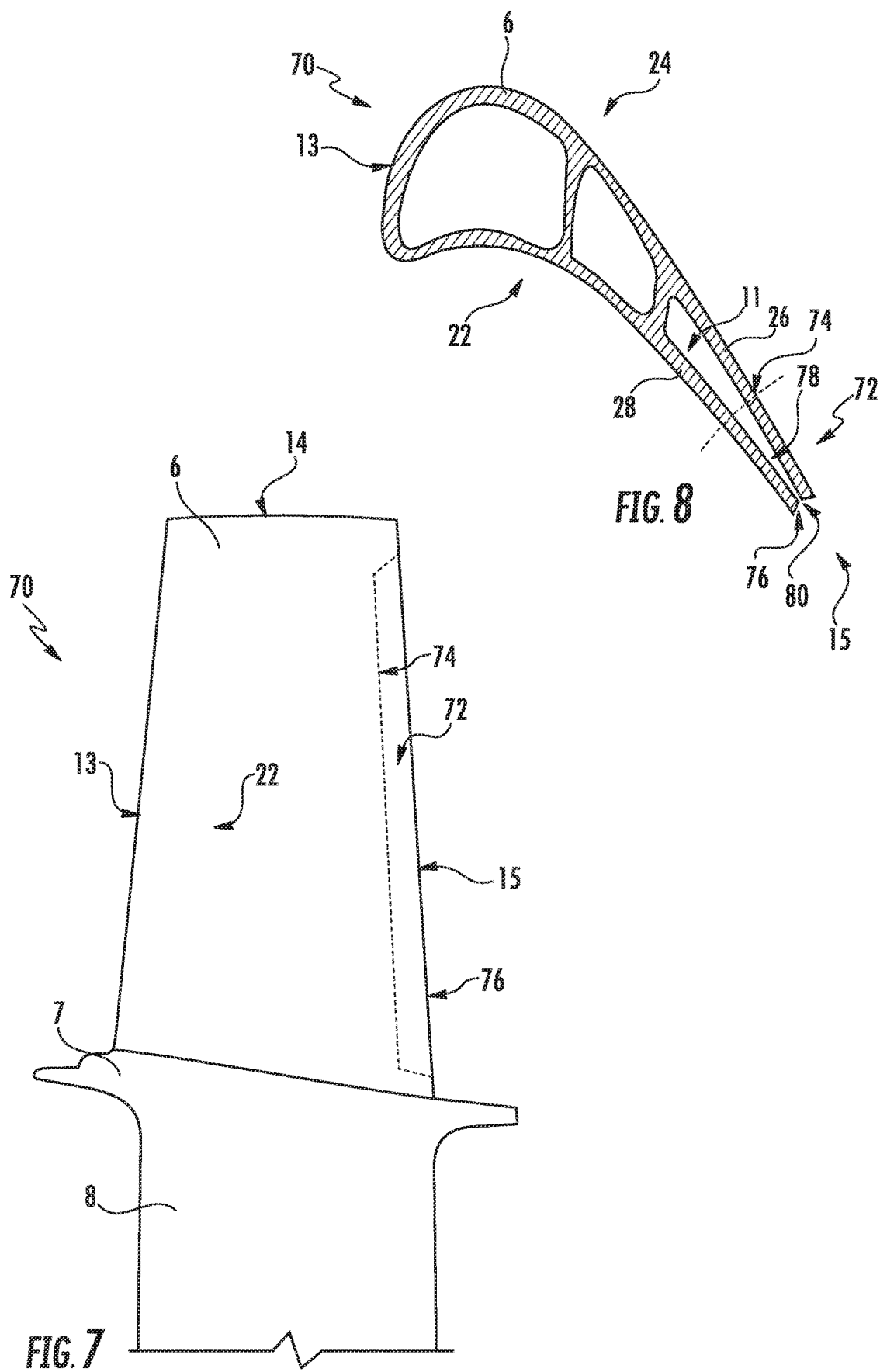
FIG. 7 is a side view of a repaired component having a replacement portion on the trailing edge of the airfoil formed from the exemplary intermediate component of FIG. 5.
FIG. 8 is a cross-sectional view of the airfoil of FIG. 7 showing a trailing edge ejection slot defined in the replacement portion.

In particular embodiments, removal of the portion of the trailing edge 15 can be achieved by machining the component 5 around the trailing edge 15 to result in the intermediate component 50 of FIG. 5. Then, the surfaces 54 defining the cavity 52 can be prepared for subsequent application of a repaired portion 72, as shown in FIG. 7. That is, the surfaces 54 of the cavity may undergo grit blasting, water blasting, and further cleaning to remove debris and oxides from the cavity surfaces 24.

In one particular embodiment, as shown in FIG. 6A, the portion of the trailing edge 15 removed from the airfoil 6 includes both of the suction side wall 26 and the pressure side wall 28, and extends toward the leading edge 13 at least enough to completely remove the slot 20 (i.e., inward of the end 21 of the pressure side wall 28). In another embodiment, as shown in FIG. 6B, the portion of the trailing edge 15 removed from the airfoil 6 includes only the pressure side wall 28 extending toward the leading edge 13 at least enough to completely remove the slot 20 (i.e., inward of the end 21 of the pressure side wall 28), while leaving the suction side wall 26 in its original configuration.

Referring to FIGS. 7 and 8, a repaired component 70 is shown formed from the intermediate component 50 of FIG. 5 with a replacement portion 72 applied within the space where the cavity 22 was located along the trailing edge 15 of the airfoil 6. The replacement portion 72 is bonded to the surface 54 of the cavity at the braze 74, although it is not visibly detectable in many embodiments.

In order to form the repaired component 70, the replacement portion 72 is formed via an additive manufacturing process, either directly onto the intermediate component 50 (e.g., applied layer by layer directly onto the surfaces 54 of the cavity 52) or formed separately from the intermediate component 50 and subsequently bonded onto the surfaces 54 of the cavity 52. In either method, the use of additive manufacturing allows for the replacement portion 72 to have a repaired geometry that is different than the original geometry of the component 5 and/or of its damaged geometry after use. For example, in the particular embodiment shown in FIGS. 7 and 8, the replacement portion 72 includes at least one trailing edge ejection slot 76 absent in the original and/or damaged geometry. Each trailing edge ejection slot 76 is fluidly connected to an internal cavity 11 such that a cooling supply can be directed through the trailing edge ejection slot 76 of the repaired component 70. For example, the replacement portion 72 can include a plurality of trailing edge ejection slots 76 absent in the original geometry of the airfoil 6. In one embodiment, the replacement portion 72 is substantially identical to the original geometry of the trailing edge 15 but for the at least one trailing edge ejection slot 76 of the replacement geometry that is absent in the original geometry. Thus, the repaired component 70 can be rebuilt so as to be modified, improved, or otherwise altered from the original design in response to corrective action to relieve the cause that formed the damaged region (e.g., exposure to excess heat). For example, the trailing edge ejection slot 76 of the repaired geometry can mitigate heat loading directed at the component 5 in the trailing edge 15.

Figure 9:
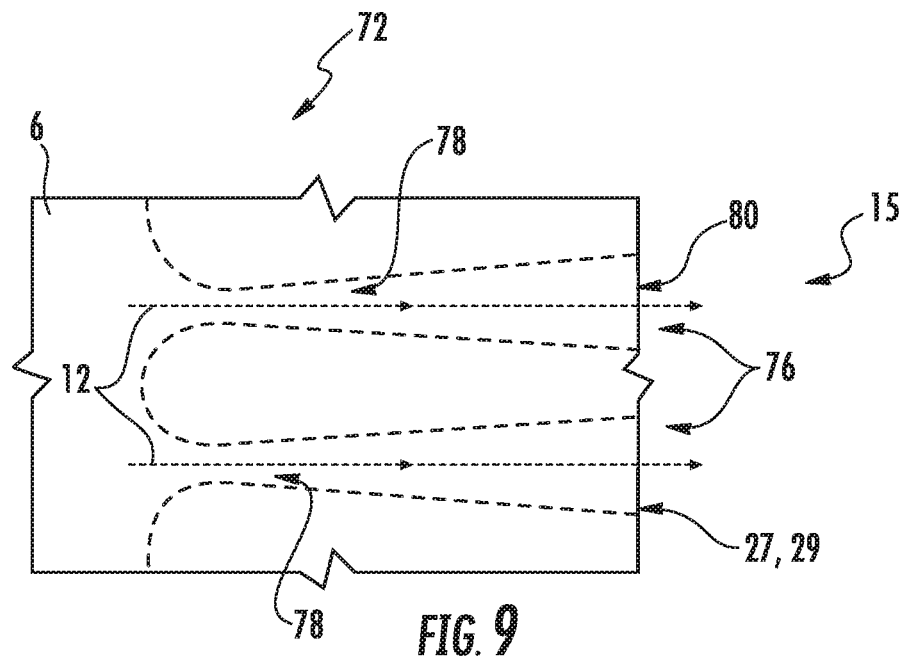
FIG. 9 is a close-up view of the trailing edge of the airfoil of FIG. 7 showing the trailing edge ejection slots defined in the replacement portion.
Figure 10:
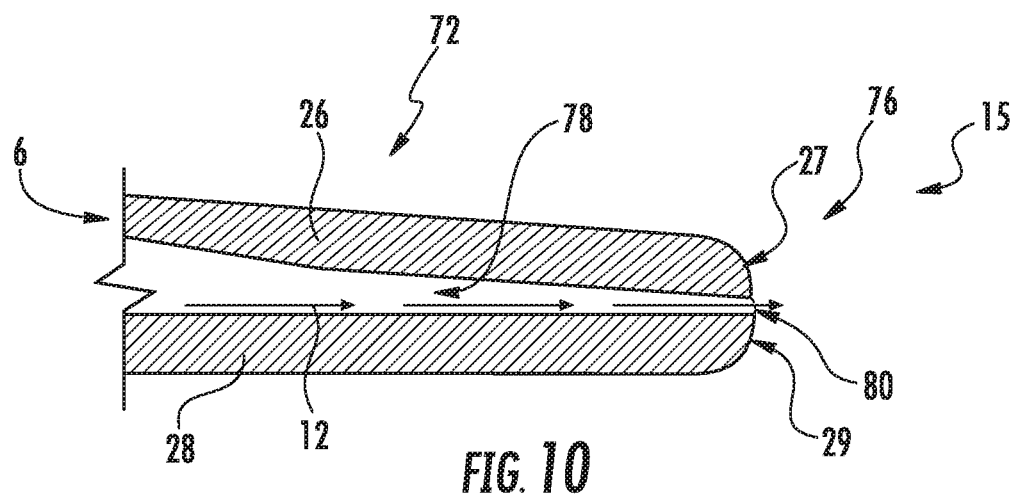
FIG. 10 is a close-up cross-sectional view of the trailing edge of the airfoil of FIG. 9.

More particularly, FIGS. 9 and 10 show exemplary trailing edge ejection slots 76 defined by the replacement portion 72. Each of the trailing edge ejection slots 76 includes an internal channel 78 defined between the suction side wall 26 and the pressure side wall 28, which is fluidly connected to the inner passage 11 of the airfoil 6. As shown, the pressure side wall 28 extends farther toward the end of the trailing edge 15 than where the end 21 of the slot 20 of the original airfoil 6 of FIG. 1-4 extended. As shown in FIGS. 9 and 10, the terminal ends 27, 29 of the suction side wall 26 and the pressure side wall 28, respectively, generally terminate together to define a slot 80 therebetween. The improved geometry of the trailing edge ejection slots 76 formed by additive manufacturing allows the size of the holes in the trailing edge 15 to be controlled to rebuild the trailing edge with base ejection holes of constant cross sectional shape (round, elliptic, racetrack, etc.), or as a metering portion followed by a diffusing portion. If desired, the rebuilt passages and holes may be of smaller or larger size to save cooling flow, or to cool a distressed region better. As an additive manufacturing build process, smaller holes or differently shaped passages may be incorporated compared to the initially limited cast geometry. Holes can be any configuration, and passages any direction, arcuate, zig-zag, etc.

The replacement portion 72 may be formed from a material that has a substantially identical composition than the material of the component 5 (e.g., the same superalloy). Alternatively, the replacement portion 72 may be formed from a material that is different in composition than the material of the component 5 (e.g., different superalloy). However, when using different materials, the coefficient of thermal expansion (CTE) should be tailored to be close to each other to keep the material from spalling during use in the operating conditions of a turbine engine.

In one embodiment, the replacement portion 72 is formed via a direct metal laser fusion process, which is a laser-based rapid prototyping and tooling process utilizing precision melting and solidification of powdered metal into successive layers of larger structures, each layer corresponding to a cross-sectional layer of the 3D component. As known in the art, the direct metal laser fusion system relies upon a design model that may be defined in any suitable manner (e.g., designed with computer aided design (CAD) software). The model may include 3D numeric coordinates of the entire configuration of the component including both external and internal surfaces of an airfoil, platform and dovetail, as well as any internal channels and openings. In one exemplary embodiment, the model may include a number of successive 2D cross-sectional slices that together form the 3D component. Particularly, such a model includes the successive 2D cross-sectional slices corresponding to the turbine component from the machined height. For example, the intermediate component 50 can be imaged to create a digital representation of the intermediate component 50 after removal of the damaged portion 10, and a CAD model can be utilized to form the replacement portion 72 thereon.

Any suitable laser and laser parameters may be used, including considerations with respect to power, laser beam spot size, and scanning velocity. The build material may be formed by any suitable powder, including powdered metals, such as a stainless steel powder, and alloys and super alloy materials, such as nickel-based or cobalt superalloys. In one exemplary embodiment, the build material is a high temperature nickel base super alloy. The powder build material may be selected for enhanced strength, durability, and useful life, particularly at high temperatures. Each successive layer may be, for example, between 10 µm and 200 µm, although the thickness may be selected based on any number of parameters.

As noted above, the repaired component 70 includes internal cooling passages that deliver a cooling flow through the replacement portion 72 and out of the slots 76. The cooling passages may be relatively complex and intricate for tailoring the use of the limited pressurized cooling air and maximizing the cooling effectiveness thereof and the overall engine efficiency. However, the successive, additive nature of the laser fusion process enables the construction of these passages.

Although the direct metal laser fusion process is described above, other rapid prototyping or additive layer manufacturing processes may be used to apply and form the replacement portion 72, including micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; direct metal laser sintering; and direct metal deposition. In general, additive repair techniques provide flexibility in free-form fabrication and repair without geometric constraints, fast material processing time, and innovative joining techniques.

Other post processing may be performed on the repaired component 70, such as stress relief heat treatments, peening, polishing, hot isostatic pressing (HIP), or coatings.

Although described above and in FIGS. 1, 5, and 7 with respect to the turbine blade 5, the methods of repair can be utilized with any component of the gas turbine engine, such as turbine nozzles (e.g., airfoils of a turbine nozzle or nozzle segment), compressor blades, compressor vanes, combustion liners, fan blades, etc.

Figure 11:
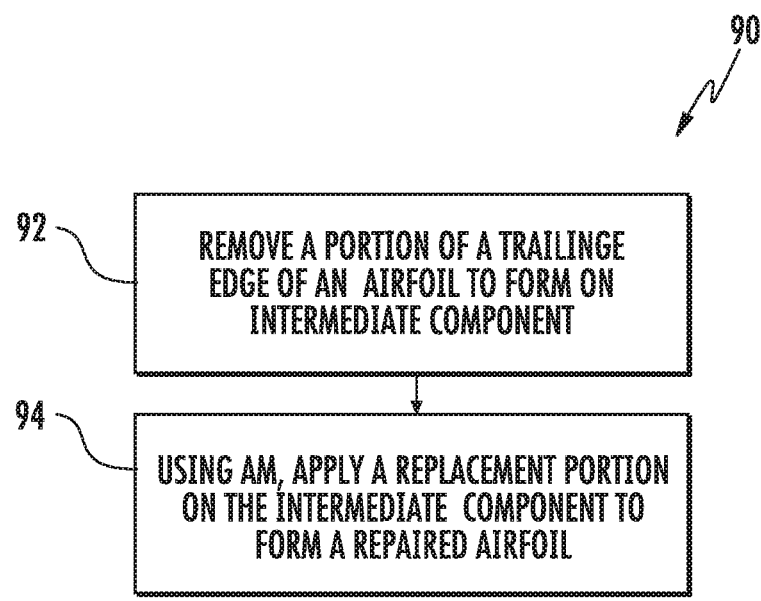
FIG. 11 is a diagram showing an exemplary method of repairing a trailing edge of an airfoil.

FIG. 11 shows a diagram of an exemplary method 90 of repairing a damaged portion of a component. At 92, a portion of the trailing edge is removed from an airfoil to form an intermediate component. At 94, using additive manufacturing (AM), a replacement portion is applied onto the intermediate component to form a repaired airfoil having at least one trailing edge ejection slot.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A method of repairing a trailing edge of an airfoil, the method comprising:
removing a portion of the trailing edge of the airfoil to form an intermediate component, wherein the portion of the trailing edge comprises at least one trailing edge bleed slot located inward of the trailing edge on a pressure side of the airfoil, the at least one trailing edge bleed slot including a diffusion section defined by an inner surface of a suction side wall which extends beyond a slot end of a pressure side wall; and
applying using additive manufacturing a replacement portion on the intermediate component to form a repaired airfoil, wherein the replacement portion defines at least one trailing edge ejection slot absent in an original airfoil geometry, the trailing edge ejection slot being defined between terminal ends of a pressure side wall and a suction side wall, the pressure side wall and the suction side wall terminating together at the end of the trailing edge of the airfoil.

2. The method of claim 1, wherein the portion of the trailing edge of the airfoil removed defines a plurality of trailing edge bleed slots.

3. The method of claim 2, wherein each of the trailing edge ejection slots are fluidly connected to an internal passage defined within the airfoil.

4. The method of claim 2, wherein each of the trailing edge ejection slots is in fluid communication with a cooling supply internal within the airfoil.

5. The method of claim 1, wherein removing the portion of the trailing edge of the airfoil comprises removing the entire trailing edge from the airfoil to form the intermediate component.

6. The method of claim 1, wherein applying using additive manufacturing a replacement portion on the intermediate component comprises forming the replacement portion directly onto the intermediate component through additive manufacturing.

7. The method of claim 1, wherein applying using additive manufacturing a replacement portion on the intermediate component comprises:
　forming the replacement portion using additive manufacturing; and
　thereafter, bonding the replacement portion onto the intermediate component to form the repaired component.

8. The method of claim 7, further comprising:
　imaging the intermediate component to create a digital representation of the intermediate component after removal of the damaged portion.

9. The method of claim 1, wherein the replacement portion defines a plurality of trailing edge ejection slots.

10. The method of claim 1, wherein the airfoil comprises a first material, and wherein the replacement portion comprises a second material that has a composition that is compatible to the first material.

11. The method of claim 10, wherein the first material and the second material comprise a super-alloy material.

12. The method of claim 1, wherein the airfoil and the replacement portion have the same composition.

13. The method of claim 1, wherein airfoil is a turbine blade.

14. The method of claim 13, wherein the turbine blade comprises an airfoil connected to a platform and a dovetail connected to the platform.

15. The method of claim 1, wherein the airfoil is a turbine nozzle segment comprising the airfoil extending from an inner band to an outer band.

16. The method of claim 1, wherein the replacement portion includes at least one film holes absent in the removed portion.

17. The method of claim 1, further comprising:
　forming a repaired geometry of the airfoil which is different than an original geometry of the airfoil.

18. The method of claim 1, further comprising:
　forming a repaired geometry of the airfoil which is different than a damaged geometry of the airfoil.

19. The method of claim 1, further comprising:
　forming a repaired geometry of the airfoil which is different than an original geometry of the airfoil and is different than a damaged geometry of the airfoil.

20. The method of claim 1, wherein a pressure side wall has a first length terminating at the at least one trailing edge bleed slot of the removed portion of the trailing edge, wherein the pressure side wall has a second length terminating at the at least one trailing edge ejection slot of the replacement portion, and wherein the second length is greater than the first length.

* * * * *